United States Patent
Xu et al.

(10) Patent No.: US 11,812,291 B2
(45) Date of Patent: Nov. 7, 2023

(54) METHOD FOR CONFIGURING MEASUREMENT INFORMATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Weijie Xu, Dongguan (CN); Ning Yang, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 496 days.

(21) Appl. No.: 17/127,665

(22) Filed: Dec. 18, 2020

(65) Prior Publication Data

US 2021/0153046 A1 May 20, 2021

Related U.S. Application Data

(63) Continuation of application No. PCT/CN2018/092224, filed on Jun. 21, 2018.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC ............................. H04W 24/08; H04W 24/10
See application file for complete search history.

(56) References Cited

U.S. PATENT DOCUMENTS

| | | | |
|---|---|---|---|
| 2012/0088505 A1* | 4/2012 | Toh | H04W 8/186 455/434 |
| 2012/0281573 A1 | 11/2012 | Kazmi et al. | |

(Continued)

FOREIGN PATENT DOCUMENTS

| | | |
|---|---|---|
| CN | 102123435 A | 7/2011 |
| CN | 102869025 A | 1/2013 |

(Continued)

OTHER PUBLICATIONS

The EESR of corresponding European application No. 18923685.4, dated Jun. 22, 2021.

(Continued)

*Primary Examiner* — Kevin C. Harper
(74) *Attorney, Agent, or Firm* — Ladas & Parry, LLP

(57) ABSTRACT

Provided are a method for configuring measurement information, a terminal device, and a network device. The method includes: a terminal device receives measurement information transmitted by a network device, where the measurement information includes at least one physical-layer Cell identity PCI; the terminal device determines at least one cell according to the above mentioned at least one PCI; and the terminal device measures signal quality of the above mentioned at least one cell. In embodiments of the present application, the measurement information configured by the network device for the terminal device can enable the terminal device to determine at least one cell directly according to at least one PCI in the measurement information, and then to perform the measurement of signal quality based on the at least one determined cell.

10 Claims, 4 Drawing Sheets

(56) References Cited

U.S. PATENT DOCUMENTS

| | | | |
|---|---|---|---|
| 2016/0095008 A1* | 3/2016 | Zhao | H04W 36/0085 |
| | | | 370/252 |
| 2017/0026882 A1 | 1/2017 | Centonza et al. | |
| 2018/0220458 A1* | 8/2018 | Ouchi | H04L 27/01 |
| 2019/0306739 A1* | 10/2019 | Kim | H04L 5/0096 |

FOREIGN PATENT DOCUMENTS

| | | |
|---|---|---|
| CN | 102123435 B | 4/2014 |
| CN | 105323041 A | 2/2016 |
| CN | 106231627 A | 12/2016 |
| CN | 106658566 A | 5/2017 |
| CN | 108156637 A | 6/2018 |

OTHER PUBLICATIONS

Vodafone:"PCI Allocation and Blacklisting at Country Borders in EUTRAN", 3GPP Draft; R2-086463, 3rd Generation Partnership Project (3GPP), Mobile Competence Centre; 650, Route Des Lucioles; F-06921 Sophia-Antipolis Cedex; France, No. Prague, Czech Republic; Nov. 3, 2018 Nov. 3, 2008(Nov. 3, 2008), XP050321963.

The international search report of PCT application No. PCT/CN2018/092224, dated Jan. 23, 2019.

The Written Opinion of PCT application No. PCT/CN2018/092224, dated Jan. 23, 2019.

The first Office Action and search report of corresponding Chinese application No. 201880094807.2, dated Dec. 1, 2022 with machine translation by Google Translate.

* cited by examiner

METHOD FOR CONFIGURING MEASUREMENT INFORMATION, TERMINAL DEVICE, AND NETWORK DEVICE

CROSS-REFERENCE TO RELATED APPLICATIONS

This application is a continuation of International Application No. PCT/CN2018/092224 filed on Jun. 21, 2018, the content of which is incorporated herein by reference in its entirety.

TECHNICAL FIELD

Embodiments of the present application relate to the field of communications and, in particular, to a method for configuring measurement information, a terminal device, and a network device.

BACKGROUND

Due to people's requirements on speed, delay, high-speed mobility and energy efficiency as well as diversity and complexity of services in future life, the $3^{rd}$ Generation Partnership Project (3GPP) international standards organization has started development of the $5^{th}$ Generation mobile communication technology (5-Generation, 5G).

In early deployment of New Radio (NR), it is difficult to obtain complete NR coverage, so typical network coverage is wide-area Long Term Evolution (LTE) coverage and NR island coverage modes. Also, since a great number of LTE deployment is below 6 GHz, there are few spectrums below 6 GHz available for 5G. Therefore, for NR, study on application of spectrums above 6 GHz is a must, while a high frequency band has limited coverage and fast signal fading. In the prior art, in order to protect early investment of mobile operators in LTE, a tight interworking operation mode between the LTE and the NR was proposed. Meanwhile, the NR can also be deployed independently.

However, regardless of the LTE or the NR, when a terminal device measures signal quality, all objects measured by it are a frequency point and some other configuration parameters at the frequency point, such as a subcarrier spacing, etc. That is, all cells that meet a parameter configuration condition at the frequency point will be measured. In the LTE, the physical-layer Cell identity (PCI) is 504, and in the NR, the physical-layer Cell identity PCI is 1008. That is, for a certain configuration parameter, UE needs to traverse Primary Synchronization Signal (PSS) and Secondary Synchronization Signal (SSS) corresponding to all possible PCIs to detect possible cells.

In actual network deployment, at a current location, there may be dozens of or about a dozen cell IDs corresponding to one certain measurement object.

Therefore, there is an urgent need for a method for configuring measurement information in the field of communications, so that workload of a terminal device can be reduced when the terminal device needs to measure signal quality of a cell.

SUMMARY

A method for configuring measurement information, a terminal device and a network device are provided, so that workload of the terminal device can be reduced when the terminal device needs to measure signal quality of a cell.

In a first aspect, provided is a method for configuring measurement information, including:
  receiving, by a terminal device, measurement information transmitted by a network device, where the measurement information includes at least one physical-layer Cell identity PCI;
  determining, by the terminal device, at least one cell according to the at least one PCI; and
  measuring, by the terminal device, signal quality of the at least one cell.

In some possible implementations, the terminal device is in a connected state, and the measurement information includes: first information corresponding to the at least one PCI;
  the first information including at least one of the following information: an identity of at least one cell group to which the at least one cell belongs, an identity, a frequency, and a subcarrier spacing of the at least one cell.

In some possible implementations, the terminal device is in an idle state, and the measurement information includes: a first frequency corresponding to the at least one PCI;
  a priority of the first frequency being higher than a priority of a current camping frequency of the terminal device.

In some possible implementations, the measurement information is related to a situation of a radio resource control RRC connection between the terminal device and the network device.

In some possible implementations, the measurement information includes:
  information for the terminal device in a connected state to determine the at least one cell, and/or information for the terminal device in an idle state to determine the at least one cell.

In a second aspect, provided is a method for configuring measurement information, including:
  generating, by a network device, measurement information, where the measurement information includes at least one physical-layer Cell identity PCI, and where the at least one PCI is used for a terminal device to determine at least one cell of which signal quality needs to be measured; and
  transmitting, by the network device, the measurement information to the terminal device.

In some possible implementations, the terminal device is in a connected state, and the measurement information includes: first information corresponding to the at least one PCI;
  the first information including at least one of the following information: an identity of at least one cell group to which the at least one cell belongs, an identity, a frequency, and a subcarrier spacing of the at least one cell.

In some possible implementations, the terminal device is in an idle state, and the measurement information includes: a first frequency corresponding to the at least one PCI;
  a priority of the first frequency being higher than a priority of a current camping frequency of the terminal device.

In some possible implementations, the generating, by a network device, measurement information includes:
  generating, by the network device, the measurement information according to a situation of a radio resource control RRC connection between the terminal device and the network device.

In some possible implementations, the measurement information includes:

information for the terminal device in a connected state to determine the at least one cell, and/or information for the terminal device in an idle state to determine the at least one cell.

In a third aspect, provided is a communication device for performing the method of any one of the above mentioned first aspect to second aspect or the method of the above mentioned any possible implementation.

In some possible implementations, the communication device includes:
a function module for performing the method of any one of the above mentioned first aspect to second aspect or the method of the above mentioned any possible implementation.

In some possible implementations, the communication device is a terminal device, and the terminal device is configured to perform the method of the above mentioned first aspect or the method of any possible implementation of the above mentioned first aspect.

In some possible implementations, the communication device is a network device, and the network device is configured to perform the method of the second aspect described previously or the method of any possible implementation of the second aspect described previously.

In a fourth aspect, provided is a communication device, including:
a processor, configured to call and run a computer program from a memory, where the computer program is configured to perform the method of any one of the above mentioned first aspect to second aspect or the method of the above mentioned any possible implementation.

In some possible implementations, the communication device further includes:
a memory, configured to store the computer program.

In some possible implementations, the communication device is a terminal device, and the terminal device is configured to perform the method of the above mentioned first aspect or the method of any possible implementation of the above mentioned first aspect.

In some possible implementations, the communication device is a network device, and the network device is configured to perform the method of the second aspect described previously or the method of any possible implementation of the second aspect described previously.

In a fifth aspect, provided is a chip for performing the method of any one of the above mentioned first aspect to second aspect or the method of the above mentioned any possible implementation.

In some possible implementations, the chip includes:
a processor, configured to call and run a computer program from a memory, where the computer program is configured to perform the method of any one of the above mentioned first aspect to second aspect or the method of the above mentioned any possible implementation.

In some possible implementations, the chip further includes:
a memory, configured to store the computer program.

In a sixth aspect, provided is a computer-readable storage medium, where the storage medium is configured to store a computer program for performing the method of any one of the above mentioned first aspect to second aspect or the method of the above mentioned any possible implementation.

In a seventh aspect, provided is a computer program product including computer program instructions, where the computer program is configured to perform the method of any one of the above mentioned first aspect to second aspect or the method of the above mentioned any possible implementation.

In an eighth aspect, provided is a computer program which, when running on a computer, enables the computer to perform the method of any one of the above mentioned first aspect to second aspect or the method of above mentioned any possible implementation.

In a ninth aspect, provided is a communication system, including: a terminal device and a network device; where the terminal device is configured to: receive measurement information transmitted by the network device, the measurement information including at least one physical-layer Cell identity PCI; determine at least one cell according to the at least one PCI; and measure signal quality of the at least one cell; and where the network device is configured to generate the measurement information and transmit the measurement information to the terminal device.

In some possible implementations, the terminal device is configured to perform the method of the above mentioned first aspect or the method of the above mentioned any possible implementation, and the network device is configured to perform the method of the second aspect described previously or the method of any possible implementation of the second aspect described previously.

Through the above mentioned technical solutions, the measurement information configured by the network device for the terminal device can enable the terminal device to determine at least one cell directly according to at least one PCI in the measurement information, and then to perform the measurement of signal quality based on the at least one determined cell, so that the terminal device is prevented from traversing PSSs and SSSs corresponding to all possible PCIs, that is, ranges of the PSSs and the SSSs corresponding to the PCIs that need to be traversed can be narrowed to the greatest extent possible, thereby effectively reducing workload of measurement for the terminal device and achieving a purpose of energy conservation.

DESCRIPTION OF EMBODIMENTS

The technical solutions in the embodiments of the present application will be described hereunder with reference to the accompanying drawings in the embodiments of the present application. Obviously, the described embodiments are a part of the embodiments of the present application, rather than all embodiments of the present application. All other embodiments obtained by persons of ordinary skill in the art based on the embodiments of the present application without any creative effort should fall into the scope claimed in the present application.

Figure 1:
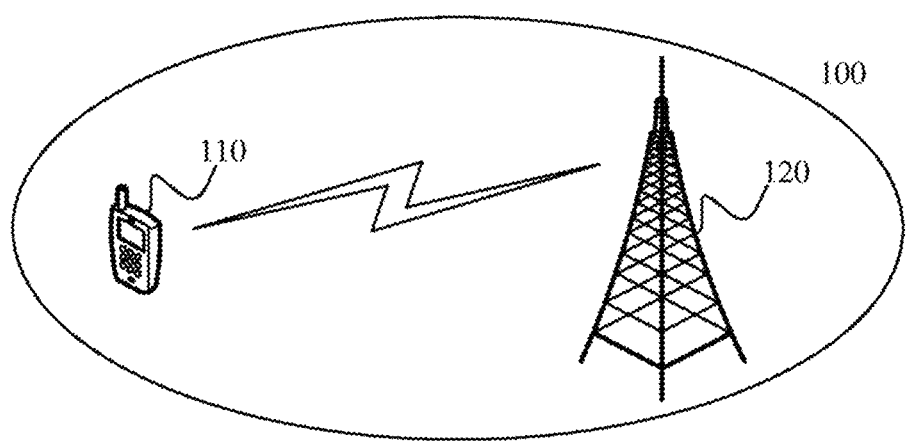
FIG. 1 is an example of an application scenario of the present application.

FIG. 1 is a schematic diagram of an application scenario of an embodiment of the present application.

As shown in FIG. 1, a communication system 100 may include a terminal device 110 and a network device 120. The network device 120 can communicate with the terminal device 110 through an air interface. Multi-service transmission is supported between the terminal device 110 and the network device 120.

It should be understood that the embodiments of the present application are only exemplarily described with the communication system 100, but the embodiments of the present application are not limited thereto. That is to say, the technical solutions in the embodiments of the present application can be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, LTE Time Division Duplex (TDD), a Universal Mobile Telecommunication System (UMTS), a Worldwide Interoperability for Microwave Access (WiMAX) communication system, a New Radio (NR) or future 5G system, etc.

With the 5G system as an example, the technical solutions in the embodiments of the present application can be applied in a wide-area Long Term Evolution (LTE) coverage mode and an NR island coverage mode. Optionally, a tight inter-working operation mode is used between LTE and NR.

Main application scenarios of 5G include: Enhanced Mobile Broadband (eMBB), Ultra-Reliable and Low Latency Communication (URLLC), and massive machine type of communication (mMTC). Among them, the eMBB aims at users obtaining multimedia content, services and data, and its demand is growing very rapidly. Since the eMBB may be deployed in different scenarios, for example, indoors, urban areas, rural areas, etc., differences in its capabilities and needs are relatively large, so generalization is not proper, instead detailed analysis can be made in conjunction with specific deployment scenarios. Typical applications of the URLLC include: industrial automation, electric power automation, telemedical operations (surgeries), and traffic safety assurance, etc. Typical characteristics of the mMTC include: high connection density, small data amount, delay-insensitive services, low costs and long usage life of modules.

In the communication system 100 shown in FIG. 1, the network device 120 may be an access network device that communicates with the terminal device 110. The access network device may provide communication coverage for a specific geographic area, and may communicate with the terminal device 110 (e.g., UE) located in the coverage area.

Optionally, the network device 120 may be a base station (Base Transceiver Station, BTS) in the Global System of Mobile communication (GSM) or the Code Division Multiple Access (CDMA), or a base station (NodeB, NB) in the Wideband Code Division Multiple Access (WCDMA), or the network device 120 may be an evolutional base station (Evolutional Node B, eNB or eNodeB) in the Long Term Evolution (LTE) system. Optionally, the network device 120 may also be a base station (gNB) in a Next Generation Radio Access Network (NG RAN) or in the NR system, or a wireless controller in a Cloud Radio Access Network (CRAN), alternatively, the access network device may be a relay station, an access point, a vehicle-mounted device, a wearable device, a hub, a switch, a bridge, a router, or a network device in a future evolutional Public Land Mobile Network (PLMN), etc.

Optionally, the terminal device 110 may be any terminal device, including but not limited to: one is connected via a wired line, e.g., connected via a Public Switched Telephone Network (PSTN), a Digital Subscriber Line (DSL), a digital cable, or a direct cable; and/or another data connection/network; and/or one via a wireless interface, e.g., for a cellular network, a Wireless Local Area Network (WLAN), a digital TV network such as a DVB-H network, a satellite network, and an AM-FM broadcast transmitter; and/or apparatus of another terminal device configured to receive/transmit communication signals; and/or an Internet of Things (IoT) device. The terminal device configured to perform communications through the wireless interface may be termed as a "wireless communication terminal", a "wireless terminal", or a "mobile terminal". Examples of the mobile terminal include, but are not limited to, a satellite or a cellular telephone; a Personal Communications System (PCS) terminal capable of combining a cellular radio telephone with data processing, facsimile, and data communication capability; a PDA that may include a radio telephone, a pager, Internet/intranet access, a web browser, a notepad, a calendar, and/or a Global Positioning System (GPS) receiver; and a conventional laptop and/or handheld receiver or other electronic device including a radio telephone transceiver. The terminal device may refer to an access terminal, User Equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be a cellular telephone, a cordless telephone, a Session Initiation Protocol (SIP) telephone, a Wireless Local Loop (WLL) station, a Personal Digital Assistant (PDA), a handheld device with wireless communication capabilities, a computing device or other processing devices connected to a wireless modem, a vehicle-mounted device, a wearable device, a terminal device in a 5G network, or a terminal device in a future evolutional PLMN, etc.

FIG. 1 exemplarily shows one network device and one terminal device. Optionally, the communication system 100 may include multiple network devices and each of network devices may include other numbers of terminal devices within its coverage area, but the embodiments of the present application are not limited thereto.

Optionally, the communication system 100 may also include other network entities, such as a network controller, a mobility management entity, etc., but the embodiments of the present application are not limited thereto.

It should be understood that the devices with communication functions in the network/system according to the embodiments of the present application may be termed as communication devices. Taking the communication system 100 shown in FIG. 1 as an example, the communication devices may include the network device 120 and the terminal device 110 with communication functions, and the network device 120 and the terminal device 110 may be specific devices described in the above, and details will not be described herein again. The communication devices may also include other devices in the communication system 100 besides the network device 120 and the terminal device 110, for example, other network entities, such as a network controller, a mobility management entity etc., which is not limited in the embodiments of the present application.

It should be understood that the terms "system" and "network" are often used interchangeably herein.

Figure 2:
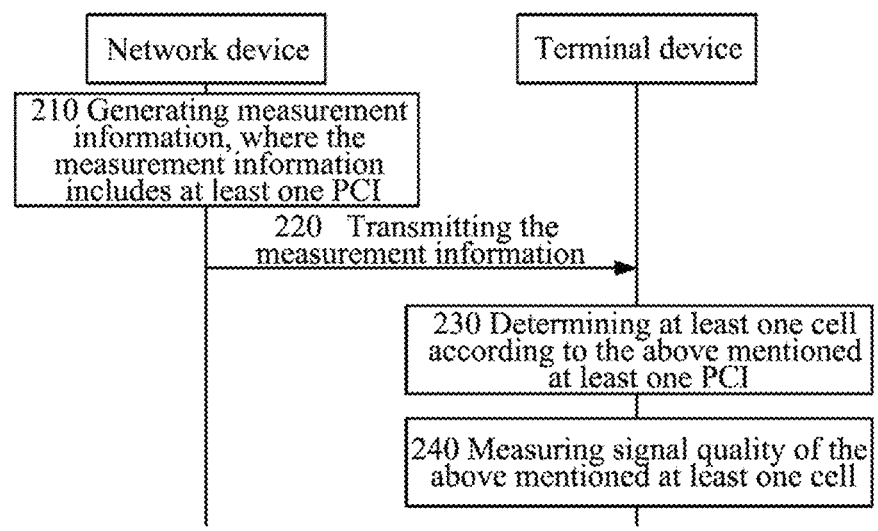
FIG. 2 is a schematic flowchart of a method for configuring measurement information of an embodiment of the present application.

FIG. 2 shows a schematic flowchart of a method 200 for configuring measurement information according to an embodiment of the present application. The method 200 may be performed by a network device or a terminal device. The terminal device shown in FIG. 2 may be the terminal device as shown in FIG. 1, and the network device shown in FIG. 2 may be the access network device shown as in FIG. 1. The method 200 includes some or all contents of the following:

S210, a network device generates measurement information, where the measurement information includes at least one physical-layer Cell identity (PCI).

S220, the network device transmits the measurement information to the terminal device.

S230, the terminal device determines at least one cell according to the above mentioned at least one PCI.

S240, the terminal device measures signal quality of the above mentioned at least one cell.

Optionally, the above mentioned PCI is used to distinguish wireless signals of different cells.

Optionally, different communication systems may correspond to different numbers of PCIs. For example, in the LTE, the physical-layer Cell identities PCI for a cell can be 504, and in the NR, the physical-layer Cell identities PCI for a cell can be 1008.

Optionally, there is a correspondence between the above mentioned PCI and at least one of the following information: a cell group identity, a cell identity, a frequency and a subcarrier spacing.

For example, with the LTE as an example, the cell group identity may be indicated as a Cell Group ID, and the cell identity may be indicated as an ID within Cell Group. Optionally, the physical-layer cell group IDs is configured to be 168, and each cell group ID is composed of 3 IDs within Cell Group, that is, a total of 168*3=504 independent PCIs.

Optionally, the terminal device may determine the above mentioned at least one cell through the above mentioned at least one PCI and the above mentioned correspondence, and then perform the measurement on signal quality of the above mentioned at least one cell. Specifically, the terminal device may traverse PSSs and SSSs corresponding to the above mentioned at least one PCI. For example, a cell group identity and a cell identity are determined based on the above mentioned at least one PCI, and then the PSSs and the SSSs are traversed based on the determined cell group identity and cell identity.

In an embodiment of the present application, the measurement information configured by the network device for the terminal device can enable the terminal device to determine at least one cell directly according to at least one PCI in the measurement information, and then to perform the measurement of signal quality based on the at least one determined cell, so that the terminal device is prevented from traversing PSSs and SSSs corresponding to all possible PCIs, that is, ranges of the PSSs and the SSSs corresponding to the PCIs that need to be traversed can be narrowed to the greatest extent possible, thereby effectively reducing workload of measurement for the terminal device and achieving a purpose of energy conservation.

Optionally, the measurement information may be provided to UE in the following way: system information or Radio Resource Control (RRC) signaling.

Optionally, the measurement information is related to a situation of a Radio Resource Control (RRC) connection between the terminal device and the network device.

For example, the measurement information includes other information for the terminal device to determine the above mentioned at least one cell. Thus, the terminal device determines the above mentioned at least one cell based on the above mentioned at least one PCI and the other information. For example, the other information included in the measurement information when there is an RRC connection between the terminal device and the network device is different from other information included in the measurement information when there is no RRC connection between the terminal device and the network device.

The measurement information in the embodiment of the present application will be described hereunder by using the terminal device in a connected state (that is, there is an RRC connection between the terminal device and the network device) and the terminal device in an idle state (that is, there is no RRC connection between the terminal device and the network device) as examples.

The following uses the terminal device in the connected state (RRC_CONNECTED) as an example to illustrate a specific implementation of the measurement information in the embodiment of the present application.

Optionally, when the terminal device is in the connected state, the measurement information may include:

first information and at least one physical-layer Cell identity (PCI) corresponding to the first information; where the first information includes at least one of the following information: an identity of at least one cell group to which the above mentioned at least one cell belongs, an identity, a frequency, and a subcarrier spacing of the above mentioned at least one cell. Among them, the above mentioned frequency may also be a frequency point.

In other words, for UE in a connected state, while configuring the first information, the network device configures at least one PCI corresponding to the first information for the terminal device, for example a list of PCIs. After receiving the measurement information, the UE detects at least one corresponding cell in accordance with the at least one PCI corresponding to the first information specified by the network device, and performs the measurement on the at least one detected cell and obtains signal quality of the at least one cell.

Therefore, when the terminal device needs to perform the measurement on the signal quality of a cell, it may traverse, through first information and at least one PCI corresponding to the first information, PSSs and SSSs corresponding to the above mentioned at least one PCI, and then determine the above mentioned at least one cell, so that ranges of the PSSs and the SSSs corresponding to the PCIs that need to be traversed can be narrowed to the greatest extent possible, thereby effectively reducing workload of measurement for the terminal device and achieving a purpose of energy conservation.

The following uses the terminal device in the idle state (RRC_IDLE) as an example to illustrate a specific implementation of the measurement information in the embodiment of the present application.

Optionally, when the terminal device is in the idle state, the measurement information includes: a first frequency and at least one PCI corresponding to the first frequency; a priority of the first frequency being higher than a priority of a current camping frequency of the terminal device.

Optionally, the terminal device performs cell selection and reselection according to measurement results of the above mentioned at least one cell.

In an actual operation, since cell deployment is performed based on multiple frequencies, the UE has different cell reselection priorities at different frequencies. If a priority of a frequency where the current UE camps is not the highest priority, the UE will continuously search for a frequency of high priority within a specified time interval until the UE camps at a frequency of the highest priority. With regard to the search for a high-priority frequency, the UE needs to measure signal quality of a cell at the frequency, and the UE will perform cell reselection to high-priority frequency as long as signal quality of the cell of the high-priority frequency is higher than a threshold configured by system broadcast.

In the embodiment of the present application, for the terminal device in the idle state, by means of directly configuring, in the measurement information, a first frequency having a priority higher than a priority of a current camping frequency, the cell that need to be measured by the terminal device is directly locked in a cell at the first frequency and, further, the terminal device can narrow, according to at least one PCI corresponding to the first frequency, a range of the cell that need to be measured to the above mentioned at least one cell. That is, the terminal device only needs to perform the search or measurement on the above mentioned at least one cell determined based on the PCI corresponding to the high-priority frequency, which avoids traversing PSSs and SSSs corresponding to all possible PCIs to detect a possible high-priority cell, thereby effectively reducing workload of measurement for the terminal device and achieving a purpose of energy conservation.

Optionally, for a cell reselection process, different frequencies may be configured with different priorities, e.g., an Evolved Universal Terrestrial Radio Access Network (E-UTRAN) frequency, and further e.g., an inter-frequency switching (Inter Radio Access Technology, IRAT) frequency.

Optionally, the priority configured for the frequency may be an absolute priority.

Optionally, priorities between different frequencies may be provided to UE in the following way:

system information or Radio Resource Control (RRC) signaling.

Optionally, the measurement information may include: information for the terminal device in a connected state to determine the above mentioned at least one cell, and/or information for the terminal device in an idle state to determine the above mentioned at least one cell. The term "and/or" herein is merely intended to describe an association relationships between associated objects, which indicates that there may be three relationships, for example, A and/or B may indicate presence of A only, of both A and B, and of B only. In addition, the character "/" herein generally indicates that contextual objects have an "or" relationship.

In an embodiment, the network device may firstly determine, according to a situation of an RRC connection between the terminal device and the network device, whether the measurement information includes information for the terminal device in the connected state to determine the above mentioned at least one cell or the measurement information includes the measurement information includes information for the terminal device in the idle state to determine the above mentioned at least one cell, and the network device then generates the measurement information and transmits the measurement information to the terminal device.

In another embodiment, the network device may transmit, to the terminal device, the information for the terminal device in the connected state to determine the above mentioned at least one cell together with the information for the terminal device in the idle state to determine the above mentioned at least one cell, then the terminal device determines, according to the situation of its RRC connection with the network device, the information for determining the above mentioned at least one cell, and determines the above mentioned at least one cell and measures signal quality of the above mentioned at least one cell.

It should be understood that, the terminal device in the connected state and the terminal device in the idle state are used only as examples in the embodiments of the present application, but the embodiments of the present application are not limited thereto.

For example, the measurement information involved in the embodiments of the present application may further include: information for the terminal device in an inactive state (RRC_INACTIVE) to determine the above mentioned at least one cell.

It should also be understood that the above mentioned connected state may also be termed as an active state (RRC_ACTIVE).

For ease of understanding, a brief introduction is given hereunder with regard to terminal devices in the idle state, the inactive state, and the activated state.

The RRC_INACTIVE state is different from the RRC_IDLE sate and the RRC_ACTIVE state.

For the RRC_IDLE state, there is no RRC connection between the terminal device and the network device, and the network device also does not store access stratum (AS) context of the terminal device. When the terminal device needs to be paged, paging is initiated by a core network, and a paging area is configured by the core network. Its mobility is based on cell selection or cell reselection of the terminal device.

For the RRC_CONNECTED state, there is an RRC connection between the terminal device and the network device, and the network device and the terminal device store AS context of the terminal device. The terminal device's location acquired by the network device is at a specific cell level. Its mobility is mobility controlled by the network device.

For the RRC_INACTIVE state, there is a connection between the core network (CN) and the network device, AS context of the terminal device is stored on a certain network device, paging is triggered by a Radio Access Network (RAN), and a paging area of the RAN is managed by the RAN, that is to say, the terminal device's location acquired by the network device is at a level of the paging area of the RAN. Its mobility is based on cell selection or cell reselection of the terminal device. In other words, the connection between the terminal device in the RRC_INACTIVE state and the network device is at disconnected state, and the network device retains context information of the terminal device. The context information is used to quickly establish a connection between the terminal device and the network device.

Preferred embodiments of the present application have been described in detail above with reference to the drawings. However, the present application is not limited to specific details in the above mentioned embodiments. Within the scope of the technical concept of the present application, various simple variations can be made to the technical solutions of the present application. These simple variations all belong to the scope claimed in the present application.

For example, various specific technical features described in the above mentioned specific embodiments can be combined in any suitable way without contradictions. In order to avoid unnecessary repetition, various possible combination method will not be described in the present application separately.

For another example, any arbitrary combination may also be made to various different embodiments of the present application, which should also be regarded as the contents disclosed by the present application as long as it does not violate the idea of the present application.

It should be understood that, in various method embodiments of the present application, a sequence number of the above mentioned various processes does not imply an execution order, and the execution order of each process should be determined by its function and inherent logic, but should not constitute any limitation to implementation processes in the embodiments of the present application.

The method embodiments of the present application have been described in detail above with reference to FIG. 2, and apparatus embodiments of the present application will be described in detail below with reference to FIG. 3 to FIG. 5.

Figure 3:
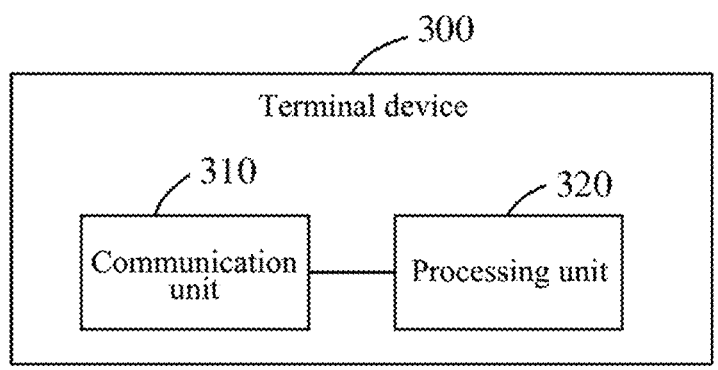
FIG. 3 is a schematic block diagram of a terminal device of an embodiment of the present application.

FIG. 3 is a schematic block diagram of a terminal device 300 of an embodiment of the present application.

Specifically, as shown in FIG. 3, the terminal device 300 may include:
a communication unit 310, configured to receive measurement information transmitted by a network device, where the measurement information includes at least one physical-layer Cell identity PCI; and
a processing unit 320, the processing unit 320 being configured to: determine at least one cell according to the at least one PCI; and measure signal quality of the at least one cell.

Optionally, the terminal device is in a connected state, and the measurement information includes: first information corresponding to the at least one PCI; the first information including at least one of the following information: an identity of at least one cell group to which the at least one cell belongs, an identity, a frequency, and a subcarrier spacing of the at least one cell.

Optionally, the terminal device is in an idle state, and the measurement information includes: a first frequency corresponding to the at least one PCI; a priority of the first frequency being higher than a priority of a current camping frequency of the terminal device.

Optionally, the measurement information is related to a situation of a radio resource control RRC connection between the terminal device and the network device.

Optionally, the measurement information includes: information for the terminal device in a connected state to determine the at least one cell, and/or information for the terminal device in an idle state to determine the at least one cell.

Figure 4:
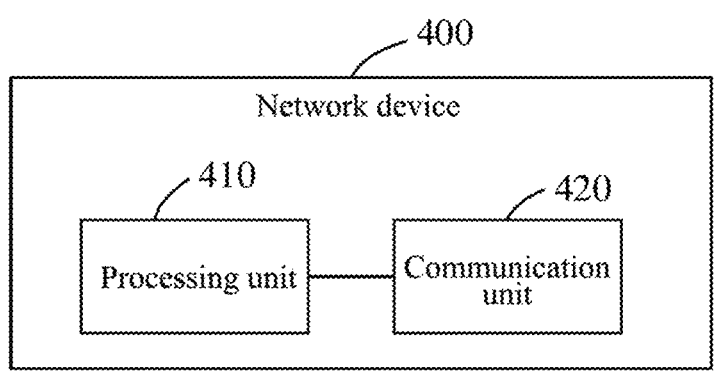
FIG. 4 is a schematic block diagram of a network device of an embodiment of the present application.

FIG. 4 is a schematic block diagram of a network device of an embodiment of the present application. As shown in FIG. 4, the network device 400 may include:
a processing unit 410, configured to generate measurement information, where the measurement information includes at least one physical-layer Cell identity PCI, and where the at least one PCI is used for a terminal device to determine at least one cell of which signal quality needs to be measured; and
a communication unit 420, configured to transmit the measurement information to the terminal device.

Optionally, the terminal device is in a connected state, and the measurement information includes: first information corresponding to the at least one PCI; the first information including at least one of the following information: an identity of at least one cell group to which the at least one cell belongs, an identity, a frequency, and a subcarrier spacing of the at least one cell.

Optionally, the terminal device is in an idle state, and the measurement information includes: a first frequency corresponding to the at least one PCI; a priority of the first frequency being higher than a priority of a current camping frequency of the terminal device.

Optionally, the processing unit 410 is further configured to: generate the measurement information according to a situation of a radio resource control RRC connection between the terminal device and the network device.

Optionally, the measurement information includes: information for the terminal device in a connected state to determine the at least one cell, and/or information for the terminal device in an idle state to determine the at least one cell.

It should be understood that the apparatus embodiments may correspond to the method embodiments each other, and for similar descriptions, reference may be made to the method embodiments. Specifically, the terminal device 300 shown in FIG. 3 and the network device 400 shown in FIG. 4 may correspond to relevant subjects for performing the method 200 in the embodiments of the present application, moreover, the foregoing and other operations and/or functions of respective units in the terminal device 300 and the network device 400 aim to implement corresponding processes of respective methods in FIG. 2, respectively. For the sake of brevity, details will not be described herein again.

The terminal device and the network device in the embodiments of the present application have been described above from the perspective of a functional module with reference to FIG. 3 and FIG. 4. It should be understood that the functional module may be implemented in a form of hardware, or implemented by instructions in a form of software, or implemented by a combination of hardware and software modules.

Specifically, each step of a method embodiment in the embodiments of the present application may be completed by a hardware integrated logic circuit and/or instructions in the form of software in the processor, the steps of the method disclosed in conjunction with the embodiments of the present application may be directly embodied as being performed and completed by a hardware decoding processor, or may be performed and completed by a combination of hardware and software modules in the decoding processor.

Optionally, the software module may be located in a storage medium mature in the art, such as a random access memory, a flash memory, a read only memory, a programmable read only memory, an electrically erasable programmable memory, a register, or the like. The storage medium is located in the memory. The processor reads information in the memory and completes the steps in the above mentioned method embodiments in conjunction with its hardware.

For example, in the embodiments of the present application, the communication unit 310 shown in FIG. 3 and the communication unit 420 shown in FIG. 4 may be implemented by a transceiver, and the processing unit 320 shown in FIG. 3 and the processing unit 410 shown in FIG. 4 may be implemented by a processor.

Figure 5:
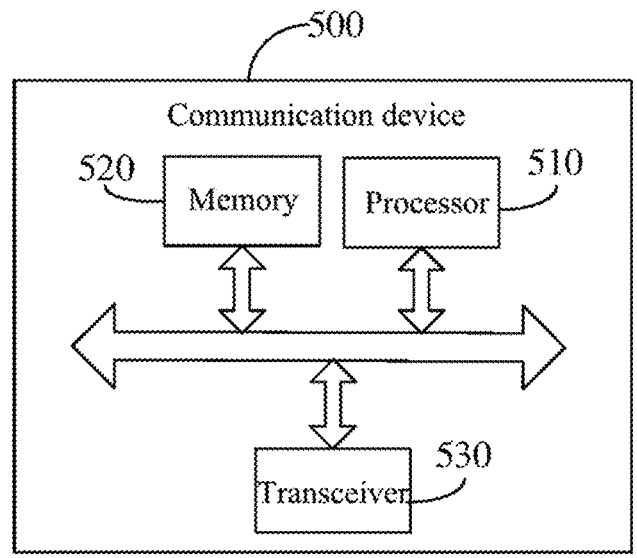
FIG. 5 is a schematic block diagram of a communication device of an embodiment of the present application.

FIG. 5 is a schematic structural diagram of a communication device 500 of an embodiment of the present application. The communication device 500 shown in FIG. 5 includes a processor 510, where the processor 510 may call and run a computer program from a memory to implement the methods in the embodiments of the present application.

Optionally, as shown in FIG. 5, the communication device 500 may further include a memory 520. The memory 520 may be configured to store instruction information, and may also be configured to store codes and instructions, etc., performed by the processor 510. Among them, the processor 510 may call and run a computer program from the memory 520 to implement the methods in the embodiments of the present application.

Among them, the memory 520 may be a separate device independent of the processor 510, or may be integrated in the processor 510.

Optionally, as shown in FIG. 5, the communication device 500 may further include a transceiver 530, and the processor 510 may control the transceiver 530 to communicate with other device, specifically, may transmit information or data to other device, or receive information or data transmitted by other device.

Among them, the transceiver 530 may include a transmitter and a receiver. The transceiver 530 may further include an antenna, and the number of the antenna may be one or multiple.

Optionally, the communication device 500 may be the network device in the embodiments of the present application, and the communication device 500 may implement corresponding processes implemented by the network device in each method of the embodiments of the present application. That is to say, the communication device 500 in the embodiment of the present application may correspond to the network device 400 in the embodiment of the present application, and may correspond to the corresponding subject for performing the method 200 according to the embodiment of the present application. For the sake of brevity, details will not be described here again.

Optionally, the communication device 500 may be the terminal device in the embodiments of the present application, and the communication device 500 may implement corresponding processes implemented by the terminal device in each method of the embodiments of the present application. That is to say, the communication device 500 in the embodiment of the present application may correspond to the terminal device 300 in the embodiment of the present application, and may correspond to the corresponding subject for performing the method 200 according to the embodiment of the present application. For the sake of brevity, details will not be described here again.

It should be understood that various components in the communication device 500 are connected by a bus system, where the bus system includes a power bus, a control bus, and a status signal bus, in addition to a data bus.

In addition, an embodiment of the present application also provides a chip. The chip may be an integrated circuit chip with signal processing capabilities, and may implement or perform various methods, steps, and logical block diagrams disclosed in the embodiments of the present application.

Optionally, the chip may be applied to various communication devices, so that a communication device mounted with the chip can perform various methods, steps, and logical block diagrams disclosed in the embodiments of the present application.

Figure 6:
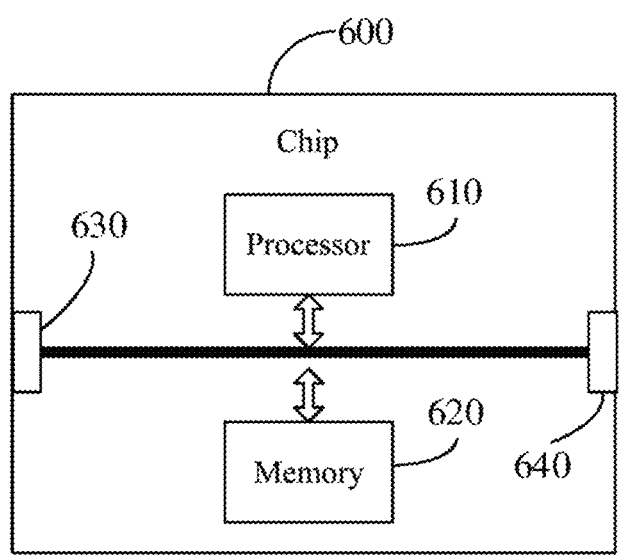
FIG. 6 is a schematic block diagram of a chip of an embodiment of the present application.

FIG. 6 is a schematic structural diagram of a chip according to an embodiment of the present application.

The chip 600 shown in FIG. 6 includes a processor 610, where the processor 610 may call and run a computer program from a memory to implement the methods in the embodiments of the present application.

Optionally, as shown in FIG. 6, the chip 600 may further include a memory 620. Among them, the processor 610 may call and run a computer program from the memory 620 to implement the methods in the embodiments of the present application. The memory 620 may be configured to store instruction information, and may also be configured to store codes and instructions, etc., performed by the processor 610.

Among them, the memory 620 may be a separate device independent of the processor 610, or may be integrated in the processor 610.

Optionally, the chip 600 may further include an input interface 630. Among them, the processor 610 may control the input interface 630 to communicate with other device or chip, specifically, may acquire information or data transmitted by other device or chip.

Optionally, the chip 600 may further include an output interface 640. Among them, the processor 610 may control the output interface 640 to communicate with other device or chip, specifically, may output information or data to other device or chip.

Optionally, the chip 600 may be applied in the network device in the embodiments of the present application, and the chip may implement corresponding processes implemented by the network device in various methods of the embodiments of the present application. For the sake of brevity, details will not be described here again.

Optionally, the chip may be applied in the terminal device in the embodiments of the present application, and the chip may implement corresponding processes implemented by the terminal device in various methods of the embodiments of the present application. For the sake of brevity, details will not be described here again.

It should be understood that the chip mentioned in the embodiment of the present application may also be termed as a system-level chip, a system chip, a chip system, or a system-on-chip chip, etc. It should also be understood that various components in the chip 600 are connected by a bus system, where the bus system includes a power bus, a control bus, and a status signal bus, in addition to a data bus.

The processor mentioned in the embodiment of the present application may be a general purpose processor, a digital signal processor (DSP), an application specific integrated circuit (ASIC), a field programmable gate array (FPGA) or other programmable logic device, transistor logic device, discrete hardware component, etc. In addition, the general purpose processor may be a microprocessor or the processor may also be any conventional processor, etc.

In addition, the memory mentioned in the embodiment of the present application may be a volatile memory or a non-volatile memory, or may include both the volatile memory and the non-volatile memory. Among them, the non-volatile memory may be a read-only memory (ROM), a programmable read only memory (programmable ROM, PROM), an erasable programmable read only memory (erasable PROM, EPROM), an electrically erasable programmable read only memory (electrically EPROM, EEPROM) or a flash memory. The volatile memory may be a random access memory (RAM), which is used as an external cache.

It should be understood that the above mentioned memory is exemplary but not restrictive illustration, for example, the memory in the embodiment of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct rambus random access memory (Direct Rambus RAM, DR RAM), etc.

An embodiment of the present application further provides a computer-readable storage medium for storing a computer program.

Optionally, the computer-readable storage medium may be applied to the network device in the embodiments of the present application, and the computer program enables a computer to perform corresponding processes implemented by the network device in various methods of the embodiments of the present application. For the sake of brevity, details will not be described here again.

Optionally, the computer-readable storage medium may be applied to the mobile terminal/the terminal device in the embodiments of the present application, and the computer program enables a computer to perform corresponding processes implemented by the mobile terminal/the terminal device in various methods of the embodiments of the present application. For the sake of brevity, details will not be described here again.

An embodiment of the present application further provides a computer program product including computer program instructions.

Optionally, the computer program product may be applied to the network device in the embodiments of the present application, and the computer program instructions enable a computer to perform corresponding processes implemented by the network device in various methods of the embodiments of the present application. For the sake of brevity, details will not be described here again.

Optionally, the computer program product may be applied to the mobile terminal/the terminal device in the embodiments of the present application, and the computer program instructions enable a computer to perform corresponding processes implemented by the mobile terminal/the terminal device in various methods of the embodiments of the present application. For the sake of brevity, details will not be described here again.

An embodiment of the present application further provides a computer program.

Optionally, the computer program may be applied to the network device in the embodiments of the present application. The computer program which, when running on a computer, enables the computer to perform corresponding processes implemented by the network device in various methods of the embodiments of the present application. For the sake of brevity, details will not be described here again.

Figure 7:
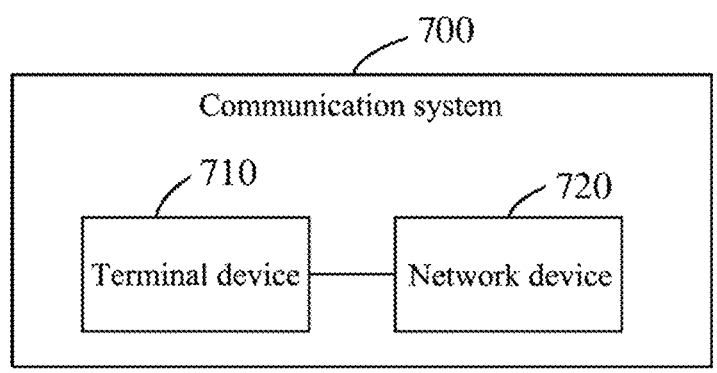
FIG. 7 is a schematic block diagram of a communication system of an embodiment of the present application.

FIG. 7 is a schematic block diagram of a communication system 700 according to an embodiment of the present application. As shown in FIG. 7, the communication system 700 includes a terminal device 710 and a network device 720. Among them the terminal device 710 is configured to: receive measurement information transmitted by the network device, the measurement information including at least one physical-layer Cell identity PCI; determine at least one cell according to the at least one PCI; and measure signal quality of the at least one cell; where the network device 720 is configured to generate the measurement information and transmit the measurement information to the terminal device.

Among them, the terminal device 710 may be configured to implement corresponding functions implemented by the terminal device in the above mentioned method 200, and the composition of the terminal device 710 may be shown as that of the terminal device 300 in FIG. 3. For the sake of brevity, details will not be described here again.

The network device 720 may be configured to implement corresponding functions implemented by the network device in the above mentioned method 200, and the composition of the network device 720 may be shown as that of the network device 400 in FIG. 4. For the sake of brevity, details will not be described here again.

It should be noted that the term "system", etc., herein may also be termed as a "network management architecture" or a "network system", etc.

It should also be understood that the terms used in the embodiments of the present application and the appended claims are merely for the purpose of describing specific embodiments, but are not intended to limit the embodiments of the present application.

For example, a singular form of "a", "the", "above mentioned", and "this" used in the embodiments of the present application and the appended claims are also intended to include a plural form unless other meanings are explicitly indicated in the context.

It may be known to persons skilled in the art that, the units and the algorithm steps of various examples that are described with reference to the embodiments disclosed herein may be implemented by electronic hardware or a combination of computer software and electronic hardware. The situation whether these functions are performed by hardware or software depends on specific applications and design constraints of the technical solutions. Persons skilled in the art may implement the described functions by using different methods for each specific application, but such implementation should not be regarded as going beyond the scope of the embodiments of the present application.

If implemented in a form of a software functional unit and sold or used as an independent product, it may be stored in a computer-readable storage medium. Based on such understanding, the technical solutions in the embodiments of the present application essentially, or the part contributing to the prior art, or a part of the technical solutions may be embodied in a form of a software product. The computer software product is stored in a storage medium, and includes several instructions for enabling a computer device (which may be a personal computer, a server, or a network device, etc.) to perform all or a part of the steps of the methods described in the embodiments of the present application. The foregoing storage medium includes: various mediums that capable of storing program codes thereon, such as a USB flash disk, a mobile hard disk, a read only memory, a random access memory, a magnetic disk, or an optical disc, etc.

It may be clearly understood by persons skilled in the art that, for the purpose of convenient and brief description, reference may be made to corresponding processes in the foregoing method embodiments for detailed working processes of the above mentioned and described systems, apparatuses and units, and details will not be described here again.

In several embodiments provided in the present application, it should be understood that the disclosed systems, apparatuses, and methods may be implemented in other manners.

For example, the division of the units or modules or components in the apparatus embodiments described above is merely a division of logical functions and there may be other divisions during actual implementations. For example, multiple units or modules or components may be combined or integrated into another system, or some units or modules or components may be omitted or not performed.

For another example, the above mentioned units/modules/components as separate parts/display parts may or may not be physically separate, that is, may be located in one position, or may be distributed on multiple network units. A part or all of the units/modules/components may be selected according to actual needs to achieve the purpose of the embodiments of the present application.

Finally, it should be noted that the forgoing displayed or discussed mutual couplings or direct couplings or communication connections may be the indirect couplings or communication connections through some interfaces, apparatuses or units, which may be in electronic, mechanical, or other forms.

The above contents are merely specific implementations of the present application; however, the scope claimed in the embodiments of the present application is not limited thereto. Any modification or replacement that may be readily envisaged of by any persons skilled in the art within the technical scope disclosed in the embodiments of present application should fall into the scope claimed in the embodiments of the present application. Thus, the scope claimed in the embodiments of the present application should be subject to the claims.

What is claimed is:

1. A method for configuring measurement information, comprising:
    receiving, by a terminal device, measurement information transmitted by a network device, wherein the measurement information comprises at least one physical-layer Cell identity (PCI); and
    determining, by the terminal device, at least one cell according to the at least one PCI;
    measuring, by the terminal device, signal quality of the at least one cell;
    when the terminal device is in a connected state, the measurement information comprises first information corresponding to the at least one PCI, wherein the first information comprises an identity of at least one cell group to which the at least one cell belongs; and
    when the terminal device is in an idle state, the measurement information comprises a first frequency corresponding to the at least one PCI, wherein a priority of the first frequency is higher than a priority of a current camping frequency of the terminal device; and performing by the terminal device, cell selection and reselection according to measurement results of the at least one cell, wherein for a cell reselection process, different first frequencies are configured with different priorities.

2. The method according to claim 1, wherein the measurement information is related to a situation of a radio resource control (RRC) connection between the terminal device and the network device.

3. The method according to claim 1, wherein the measurement information comprises:
    information for the terminal device in a connected state to determine the at least one cell, and/or information for the terminal device in an idle state to determine the at least one cell.

4. A method for configuring measurement information, comprising:
    generating, by a network device, measurement information, wherein the measurement information comprises at least one physical-layer Cell identity (PCI), and wherein the at least one PCI is used for a terminal device to determine at least one cell of which signal quality needs to be measured; and
    transmitting, by the network device, the measurement information to the terminal device;
    when the terminal device is in a connected state, the measurement information comprises first information corresponding to the at least one PCI, wherein the first information comprises an identity of at least one cell group to which the at least one cell belongs; and
    when the terminal device is in an idle state, the measurement information comprises a first frequency corresponding to the at least one PCI, wherein a priority of the first frequency is higher than a priority of a current camping frequency of the terminal device; and performing by the terminal device, cell selection and reselection according to measurement results of the at least one cell, wherein for a cell reselection process, different first frequencies are configured with different priorities.

5. The method according to claim 4, wherein the generating, by a network device, measurement information comprises:
    generating, by the network device, the measurement information according to a situation of a radio resource control (RRC) connection between the terminal device and the network device.

6. The method according to claim 4, wherein the measurement information comprises:
    information for the terminal device in a connected state to determine the at least one cell, and/or information for the terminal device in an idle state to determine the at least one cell.

7. A terminal device, comprising a processor, configured to call and run a computer program from a memory, wherein the computer program comprises:
    instructions for:
        controlling a transceiver to receive measurement information transmitted by a network device, wherein the measurement information comprises at least one physical-layer Cell identity (PCI); and
        determining at least one cell according to the at least one PCI; and
        measure signal quality of the at least one cell;
        when the terminal device is in a connected state, the measurement information comprises first information corresponding to the at least one PCI, wherein the first information comprises an identity of at least one cell group to which the at least one cell belongs; and
        when the terminal device is in an idle state, the measurement information comprises a first frequency corresponding to the at least one PCI, wherein a priority of the first frequency is higher than a priority of a current camping frequency of the terminal device; and performing by the terminal device, cell selection and reselection according to measurement results of the at least one cell, wherein for a cell reselection process, different first frequencies are configured with different priorities.

8. The terminal device according to claim 7, wherein the measurement information is related to a situation of a radio resource control (RRC) connection between the terminal device and the network device.

9. The terminal device according to claim 7, wherein the measurement information comprises:

information for the terminal device in a connected state to determine the at least one cell, and/or information for the terminal device in an idle state to determine the at least one cell.

10. A network device, comprising:
a processor, configured to call and run a computer program from a memory, wherein the computer program comprises: instructions for performing the method according to claim 4.

\* \* \* \* \*